United States Patent

Montgomery

[15] 3,688,097

[45] Aug. 29, 1972

[54] DIGITAL ATTENUATOR FOR NON-LINEAR PULSE CODE MODULATION SIGNALS

[72] Inventor: William Lloyd Montgomery, Little Silver, N.J.

[73] Assignee: Bell Telephone Laboratories, Incorporated, Murray Hill, N.J.

[22] Filed: May 20, 1970

[21] Appl. No.: 38,930

[52] U.S. Cl. ..............................235/152, 179/15 AC
[51] Int. Cl. ..............................................G06f 7/38
[58] Field of Search.........235/152, 156, 154, 92 CP, 92 MC;
174/15 AC

[56] References Cited

UNITED STATES PATENTS 2,768,352 10/1956 Von Sivers et al....179/15 UX
3,251,983 5/1966 Constant et al........235/156 X

*Primary Examiner*—Malcolm A. Morrison
*Assistant Examiner*—David H. Malzahn
*Attorney*—R. J. Guenther and William L. Keefauver

[57] ABSTRACT

Methods and apparatus for digitally performing six decibel attenuation for a class of non-linear PCM codes including the eight bit, mu = 255 companding law. The bits of this code are S ABC WXYZ, where S is the sign of the signal sample, ABC is the segment code, and WXYZ is the position code. The segment and position codes taken together describe the amplitude of the signal sample. For certain code values, the segment code is decremented; for others, the position code is right shifted. For still others, these steps are combined with a selective incrementation of the position code in order to produce accurate and uniform attenuation.

11 Claims, 8 Drawing Figures

PATENTED AUG 29 1972 3,688,097

INVENTOR
W. L. MONTGOMERY
BY R. O. Nimtz
ATTORNEY

FIG. 4

| CHORD | | INPUT PCM | INPUT WORD | | OUTPUT PCM | OUTPUT WORD | |
|---|---|---|---|---|---|---|---|
| 8 | I | 111 | WXYZ | → | 110 | WXYZ | |
| 7 | I | 110 | WXYZ | → | 101 | WXYZ | |
| 6 | I | 101 | WXYZ | → | 100 | WXYZ | |
| 5 | II | 100 | 1111 | → | 100 | 0000 | |
| | I | 100 | WXYZ | | 011 | WXYZ | $W \cdot X \cdot Y \cdot Z \neq 1$ |
| | | | | | ADD | 1 | $W_3 = W + X \cdot Y \cdot Z$ |
| | | | | → | 011 | $W_3 X_3 Y_3 \overline{Z}$ | $X_3 = X \cdot (\overline{Z} + \overline{Y}) + \overline{X} \cdot Y \cdot Z$ |
| | | | | | | | $Y_3 = \overline{Z} \cdot Y + Z \cdot \overline{Y}$ |
| 4 | II | 011 | 111Z | → | 011 | 0000 | |
| | I | 011 | WXYZ | | 010 | WXYZ | $W \cdot X \cdot Y \neq 1$ |
| | | | | | ADD | 10 | $W_2 = W + X \cdot Y$ |
| | | | | → | 010 | $W_2 X_2 \overline{Y} Z$ | $X_2 = \overline{X} \cdot Y + \overline{Y} \cdot X$ |
| 3 | II | 010 | 11YZ | → | 010 | 000Y | |
| | I | 010 | WXYZ | | 001 | WXYZ | $W \cdot X \neq 1$ |
| | | | | | ADD | 100 | |
| | | | | → | 001 | $W_1 \overline{X} Y Z$ | $W_1 = W + X$ |
| 2 | II | 001 | 1XYZ | → | 001 | 00XY | |
| | I | 001 | WXYZ | | 000 | WXYZ | $W \neq 1$ |
| | | | | | ADD | 1000 | |
| | | | | → | 000 | 1XYZ | |
| 1 | II | 000 | WXYZ | → | 000 | 0WXY | |

DIGITAL ATTENUATOR FOR NON-LINEAR PULSE CODE MODULATION SIGNALS

BACKGROUND OF THE INVENTION

1. Field of the Invention

This invention relates to digital processing and, more particularly, to the digital processing of non-linear PCM (Pulse Code Modulation) signals.

PCM signals consist of binary code words, representing the instantaneous value of a periodically sampled and quantized analog signal. Usually, PCM code words are sent in a serial bit stream to a receiving station where they are decoded into output voltage levels. These output levels are smoothed to produce a replica of the original input signal. In such systems, digital signal processing may be advantageously performed on the PCM code words in lieu of transforming the analog signal itself.

One transformation of particular interest is a reduction in amplitude by one-half, i.e., six decibel attenuation. Such attenuation is useful, for example, in echo suppression, a technique utilized on long-haul telephone transmission systems. During periods of time in which parties at each end are speaking on a long-distance telephone call (the "double-talking" condition), echo suppressors located each end of the system may be employed to reduce the gain of the signal transmitted to the opposite end, thereby reducing the ringing and echo heard by the two parties. In long-haul PCM systems, it would be convenient if the attenuator could operate directly on the PCM words of the encoded signal.

2. Description of the Prior Art

One obvious way of performing attenuation is to decode the binary PCM signals and recover a smoothed replica of the analog signal. This signal can then be attenuated as desired and the resultant re-encoded. However, this method is costly when compared to digital attenuation techniques. to Henry Shifting is one form of digital attenuation. It is well known that a right shift of one binary place is equivalent to a division of the magnitude of a binary number by two. In PCM systems using non-linear encoding methods, however, this simple manipulation does not produce uniform attenuation. Non-linear codes are commonly used in PCM systems, and arise when amplitude compression is employed during or prior to digital encoding. As an illustrative example of a technique for non-linear encoding see U. S. Pat. No. 3,015,815 issued to Henry Mann on Jan. 2, 1962, assigned to the present assignee. Mann's technique is suitable for generating the mu = 255 PCM codes described herein below.

An accurate method of digital attenuation is to first "linearize" the PCM code word, that is, produce a binary word whose magnitude is proportional to the encoded signal amplitude. Then a simple right shift can be used to attenuate, and the linear attenuated result can then be re-encoded into the non-linear PCM form. For an illustrative example of a linearizing technique effective for a particular non-linear code through not directly applicable to the below described mu = 255 codes, see the copending application Ser. No. 788,754 filed Jan. 3, 1969, now U.S. Pat. No. 3,594,560, by T. P. Stanley entitled "Digital Expander Circuit," assigned to the present assignee.

SUMMARY OF THE INVENTION

The present invention is based on the discovery of a technique for direct digital attenuation of a non-linear PCM code which obviates the necessity of the intermediate step of linearization or of decoding the entire code word. It is effective for a large class of codes. A family of codes of particular interest falling in this class is the mu = 255 family which will be described in detail below. Such codes will hereinafter be referred to simply as the mu law codes. A code in this family of particular interest in the telephone art is the eight-bit mu law code characterized by the bits S ABC WXYZ. It will be understood that the techniques disclosed herein are applicable in general for an entire class of codes as well as for the illustrative eight-bit code.

In the eight-bit mu law code S ABC WXYZ, the S bit represents the sign of the analog signal level. The remaining bits describe the magnitude of the sampled signal. ABC is termed the "segment" code, and WXYZ is the "position" code. The binary value of the bits ABC WXYZ is not proportional to the represented amplitude. The word may be thought to represent the name of the designated signal amplitude level. The systematic assignment of these names to the corresponding signal levels which occur in the mu law codes makes a simple and direct attenuation algorithm possible.

It is, therefore, the object of this invention to provide a simple and direct means for transforming the code words of the PCM signal into code words representing a signal of half the amplitude. This is to be accomplished without an intermediate step of linearization and in a manner which may be implemented with a minimum of circuitry.

The realization of these objects is made possible by the discovery that the PCM code words divide naturally into several distinctive categories under the attenuation transformation, and the discovery of simple manipulative steps which satisfy the requirements for codes in all categories. The methods of this invention provide means for recognizing the category of each code word and for combining appropriate steps which will result in accurate attenuation.

The steps which this invention performs in combination comprise: (1) decrementing the segment code by one; (2) shifting the position code right by one binary place; (3) adding to the position code a quantity dependent on the identity of the segment code.

It will be shown below that by combining the above steps in the correct order the resulting process is equivalent to the steps of (1) linearizing the PCM code word, (2) shifting the linearized word one place to the right, (3) rounding the results, and (4) re-encoding. This will be understood from the following detailed description when taken in conjunction with the drawings.

BRIEF DESCRIPTION OF THE DRAWING

FIG. 4 is a representation of the equivalent steps performed by the invention;

DETAILED DESCRIPTION

Figure 1:
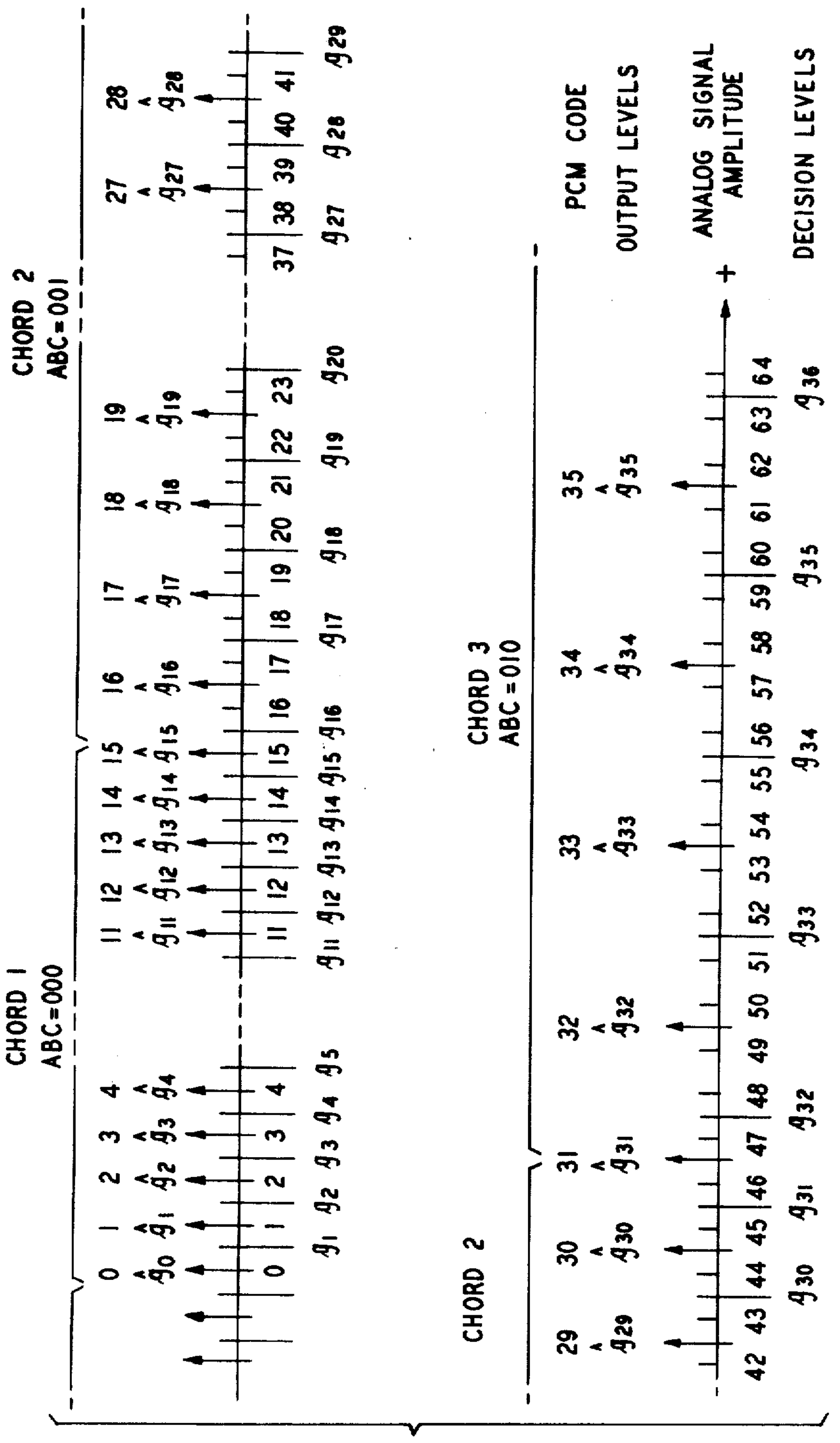
FIG. 1 is a characterization of the eight-bit mu law encoding scheme.

FIG. 1 is a detailed characterization of the eight-bit mu law encoding scheme. When taken in combination with Equations 1–3 shown below, the complete code is rigorously specified. The horizontal axis in FIG. 1 represents the analog signal amplitude positive going to the right. Along this analog amplitude scale are spaced decision levels $g_i$ and output levels $\hat{g}_i$. Negative values are not shown, since they differ only in sign.

The physical interpretation of decision levels and output levels is as follows: An analog signal amplitude falling between the decision levels $g_i$ and $g_{i+1}$ is represented by the quantized amplitude $\hat{g}_i$. $\hat{g}_i$, in turn, is represented by the subscript itself $i$ which in eight-bit binary form becomes the transmitted PCM signal. Thus, for example, $i$ = 19 (binary 10011) represents any signal sample between the limits of 21.5 and 23.5, quantized to the value of 22.5. Any sample falling within the range is therefore transmitted as a binary word S ABC WXYZ = 0 001 0011.

It will be observed that for increasing values of ABC, output levels $\hat{g}_i$ are spaced by increasing amounts. It is this non-linearity which prevents a simple right shift of the PCM code word from performing six decibel attenuation.

Each value of ABC represents a "chord." There are 16 chords, eight for each sign, in the mu law encoding scheme, though only three positive going chords are shown in FIG. 1 for brevity. Since the $\hat{g}_i$ spacing is equal in the first chord for each sign, these two chords are generally considered combined into a single "segment." This encoding scheme is therefore frequently referred to in the literature as 15-segment encoding. WXYZ is the "position code" identifying the position on the segment of the corresponding output level. S is the sign of the analog sample.

Equations 1–3 below complete the specification of the eight-bit mu law code.

| | | | |
|---|---|---|---|
| $j=1$ | $g_i = i - 0.5$ | $i = 1,2,\ldots,15$ | |
| $j=2$ | $g_i = 2i - 16.5$ | $i = 16,17,\ldots,31$ | |
| $j=3$ | $g_i = 4i - 80.5$ | $i = 32,33,\ldots,47$ | |
| $j=4$ | $g_i = 8i - 272.5$ | $i = 48,49,\ldots,63$ | |
| $j=5$ | $g_i = 16i = 784.5$ | $i = 64,65,\ldots,79$ | (1) |
| $j=6$ | $g_i = 32i - 2064.5$ | $i = 80,81,\ldots,95$ | |
| $j=7$ | $g_i = 64i - 5136.5$ | $i = 96,97,\ldots,111$ | |
| $j=8$ | $g_i = 128i - 12304.5$ | $i = 112,113,\ldots,127$ | |

$$\hat{g}_i = g_i + 2^{(j-1)} \qquad i = 1,2,\ldots,127 \qquad (2)$$

$$\hat{g}_o = 0 \qquad (3)$$

For each chord $j$, Equation 1 specifies decision levels $g_i$ appearing in that chord. Equation 2 specifies output levels $\hat{g}_i$ in terms of decision levels $g_i$ and chord number $j$.

Equation 3 defines output level $\hat{g}_o = 0$. This identifies the encoding scheme of FIG. 1 as being of "mid-tread" design, in contrast to "mid-riser" design. Mid-tread design occurs when an input analog signal of zero amplitude generates a decoded output level of zero amplitude, i.e., $\hat{g}_o = 0$; whereas, mid-riser design generates a non-zero decoded output level, i.e., $\hat{g}_o \neq 0$.

Numerous level and output assignments are possible, each defining another mu law code family. No attempt will be made to enumerate the many possible combinations, it being understood that a large class of codes may be attenuated by the methods taught herein, including but not limited to mid-tread, mid-riser, and mu law code families, as well as others.

Of particular interest is the family of 15-segment mu law codes. The general representation of any code in this family is S ABC $X_1X_2 \ldots X_n$, $n > 1$. Each chord may therefore be subdivided into any number of position codes which is a power of two, thereby changing the total number of encoding bits. The eight-bit code above described by Equations 1, 2, and 3, uses four position code bits; however, the algorithm performed by this invention may also be performed on, for example, the six-bit code characterized by the bits S ABC WX or the 10-bit code characterized by the bits S ABC $X_1X_2X_3X_4X_5X_6$.

It will be demonstrated that the algorithm performed by this invention yields the same result as would be obtained if direct digital attenuation were performed on the linearized code word. Consider, for example, the PCM code word (neglecting the sign) ABC WXYZ = 001 1110. This corresponds to decimal value $i$ = 30, which represents output level $\hat{g}_{30} = 44.5$ as can be seen from FIG. 1 or from Equations 1 and 2. The binary number for 44.5—the linearized value—is 101100.1 where the one to the right of the binary point contributes a value of 0.5. Right shifting to attenuate yields 010110.0 = 22.0, accurate to one binary place. Re-encoding now, it is seen from FIG. 1 or Equations 1 and 2 that amplitude level 22.0 falls in the interval $g_{19} - g_{20}$. It is therefore encoded as $i$ = 19, representing output level $\hat{g}_{19} = 22.5$.

Figure 2:
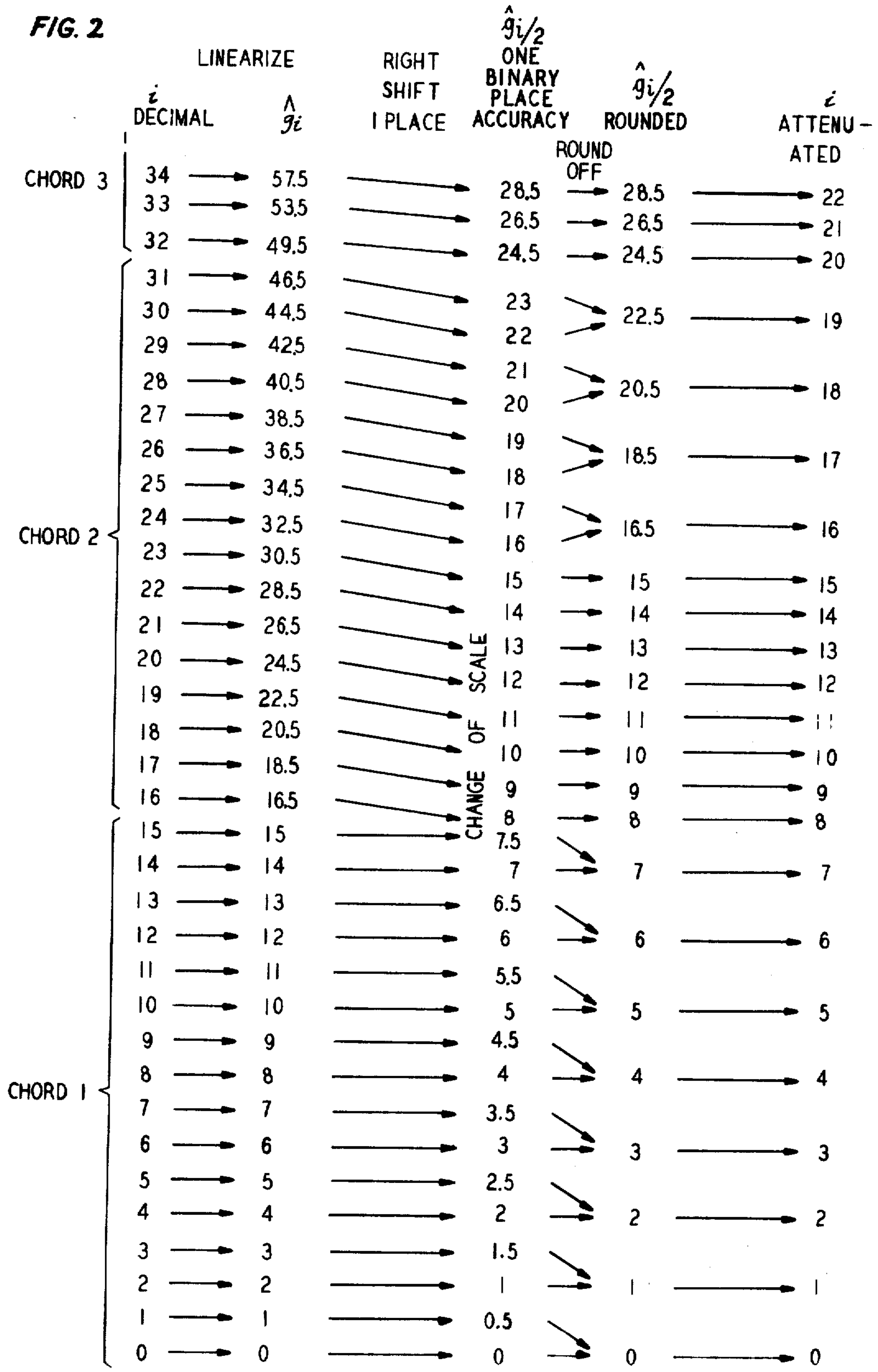
FIG. 2 demonstrates attenuation utilizing linearization.

FIG. 2 summarizes the above-described transformation process for a number of code words occurring in the eight-bit mu law code. It will be noted that the attenuation process using linearization is necessarily approximate, that is, for many code words there is no exact encoding of one-half the corresponding output levels. However, it can be appreciated that any process for attenuating this code must be approximate, and this attenuation method yields an approximation which is no worse than any other method. Likewise, it will be shown that the method of this invention yields the same results as the above method using linearization, and hence is no worse than any other method. Either method can be said to give the best possible approximation to 6 decibel attenuation, not because the result is better than any other method, but because it is no worse than any other.

Figure 3:
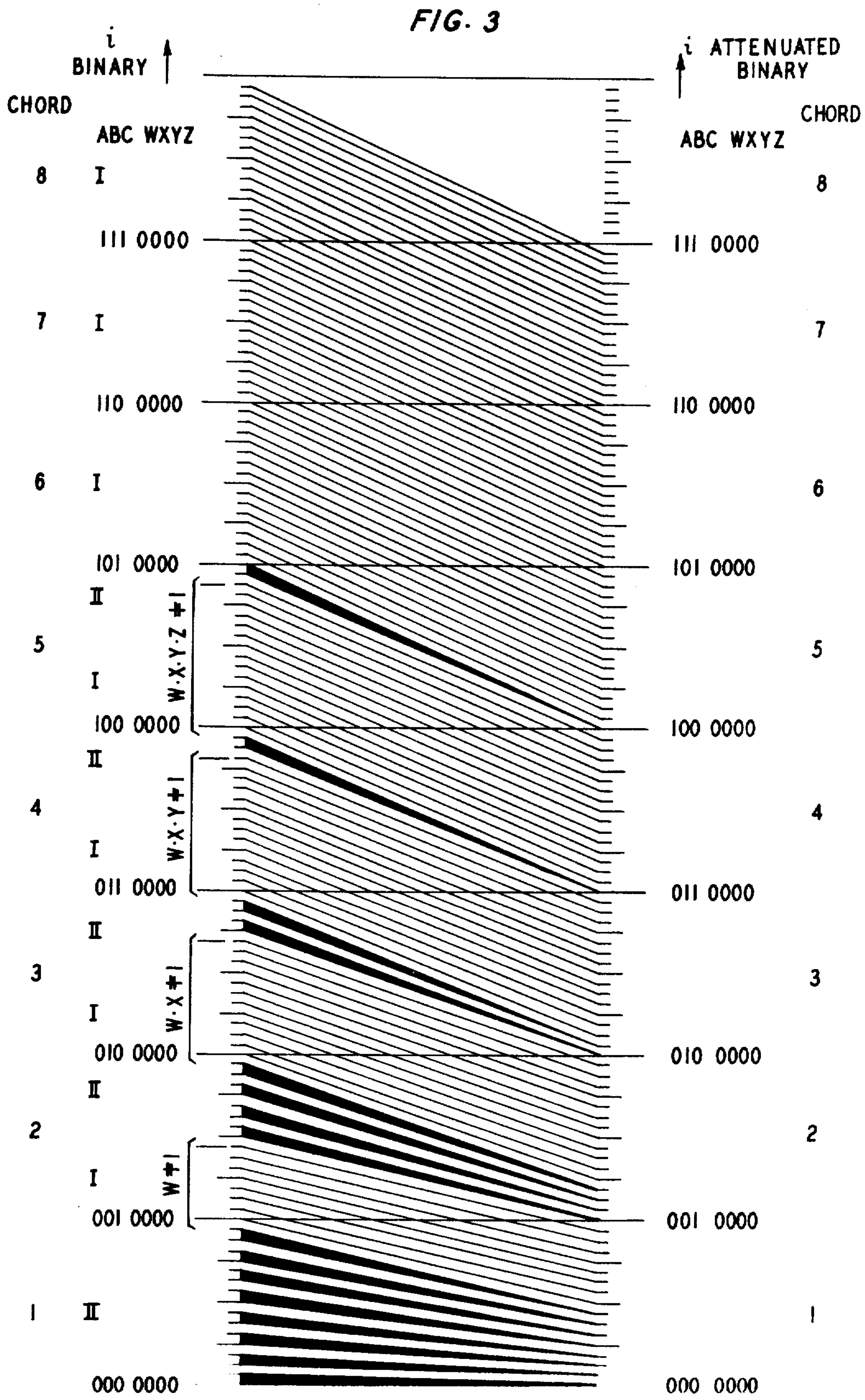
FIG. 3 shows the full attenuation transformation.

The transformations shown in FIG. 2 are further summarized in FIG. 3 along with all of the remaining code groups. FIG. 3 is therefore, a complete description of the best possible attenuation transformation for six decibel attenuation. The 128 PCM codes representing all possible combinations of the bits ABC WXYZ are shown on the left of FIG. 3, each being connected to its corresponding attenuated code on the right. The 35 codes on the bottom of the drawing are those whose transformation is shown in detail in FIG. 2. The remaining transformations are similarly derived. The method of this invention directly produces the codes on the right of FIG. 3 for each of the codes on the left of FIG. 3 without the intermediate process of linearization and in a simplified manner.

Examination of FIG. 3 will disclose the basis for the operation of the instant invention. The attenuated codes for chords 6–8 (ABC = 101–111) it will be seen, are produced by reducing the value of segment code ABC by one, while the position code WXYZ is left unaltered. Attenuation for chord 1 (ABC = 000) is accomplished by shifting the position code WXYZ right one binary place, while leaving the segment code ABC unaltered. As to these four chords, an attenuation algorithm is thus completely specified, and attention may be turned to the remaining chords 2–5 (ABC = 001–100 whose requirements for attenuation are more complex.

Consideration of the attenuation processes for chord 1 and for chords 6–8 suggests that code words naturally divide into two categories, those for which ABC must be decremented for attenuation and those for which ABC remains the same. These categories have been labeled I and II, respectively, on FIG. 3, not only for the codes in chords 1 and 6–8, but also for those in chords 2–5.

In chords 2–5 there are codes in each of the categories I and II. The category I codes have been further identified in the Figure by the logical function which describes the position code. In chord 2, for example, the codes which fall into chord 1 when attenuated can be identified as those codes having position code bit $W \neq 1$. Likewise, chord 3 codes for which bits W and X are not both one, i.e., $W \cdot X \neq 1$--fall into chord 2 when attenuated. Portions of chords 4 and 5 follow analogously. The remaining codes in chords 2–5 are in category II, and the segment code is not altered by attenuation.

Considering now just those codes in chords 2–5, it is clear that merely decrementing the segment code, or shifting the position code, will not suffice to produce the attenuation transformation desired. For the category I codes in chords 2–5, the position codes are displaced by an amount dependent on the chord (segment) identity. That is, the attenuated position codes for category I codes in chord 5 are different from the unattenuated position codes by one. Chord 4 position codes in category I are different by two. For chord 3, the difference is four, and for chord 2 the difference is eight. This suggests adding an appropriate constant to the unattenuated position code, which constant is chosen according to the identity of the segment.

For the eight-bit mu law code, the amount of the constant is one, two, four, or eight, each of which quantities is represented in binary by a single bit appropriately displaced. The methods of this invention include the performance of this addition by incrementing the position codes in a selected bit position. This process is illustrated in FIG. 4, which shows that a one is added to the W bit position in chord 2, to the X bit position in chord 3, the Y in chord 4, and the Z in chord 5. The sum digits appearing in bit positions affected by the addition are defined in the Figure as the logical function of the bits which make up the sum digit. For example, in chord 4 the sum digit $X_2$ is a one when the X bit is a zero and the Y bit is a one, or when the Y bit is a zero and the X bit is a one; otherwise, $X_2$ is a zero. This follows simply from the rules of binary addition when it is remembered that for this category of code appearing in chord 4, W, X, and Y are not all one's--i.e., $W \cdot X \cdot Y \neq 1$. The remaining category I codes in chords 2–5 follow analogously.

For the category II codes appearing in chords 2–5, a pertinent observation can be made. A one added into the bit position selected in the manner described above for category I codes will result in (1) a carry being propagated from the high order bit position of the WXYZ position code and (2) in the high order bit positions of the position code being zeroed, including the bit position where the one was added. For example, adding a one into the X bit position in a code of the form ABC WXYZ = 010 11YZ (appearing in chord 3 of FIG. 4) will produce the result 010 00YZ with a carry or overflow digit being generated at the high order W bit position.

The occurrence of such a carry or overflow digit may be used to effectively distinguish between the category I and the category II codes in chords 2–5. When an overflow occurs, the code is in category II. The high order bits of the position code have been zeroed, and all that remains to do is shift the position code right one bit position in order to complete the attenuation. The segment code is left unaltered. When no overflow occurs, the code is in category I. The position code has been correctly incremented, and all that is left to do is decrement the segment code by one.

The above considerations lead to the following technique for attenuating the eight-bit mu law code with segment code ABC and position code WXYZ. For ABC = 001 through 100, respectively, add a one to bit positions W through Z, respectively, detecting any overflow from the W bit position. In the event of an overflow or if ABC = 000, shift the position code, possibly altered by the addition step, right one binary position. In the event the above conditions are not met and the shift is not done, decrement the segment code ABC by one. The resultant is the attenuated code. Note that the above steps correctly attenuate all eight chords including chords 6–8, ABC = 101–111. For these chords, the specified conditions are not met for shifting the position code, and therefore the segment code is decremented by one.

Figure 5:
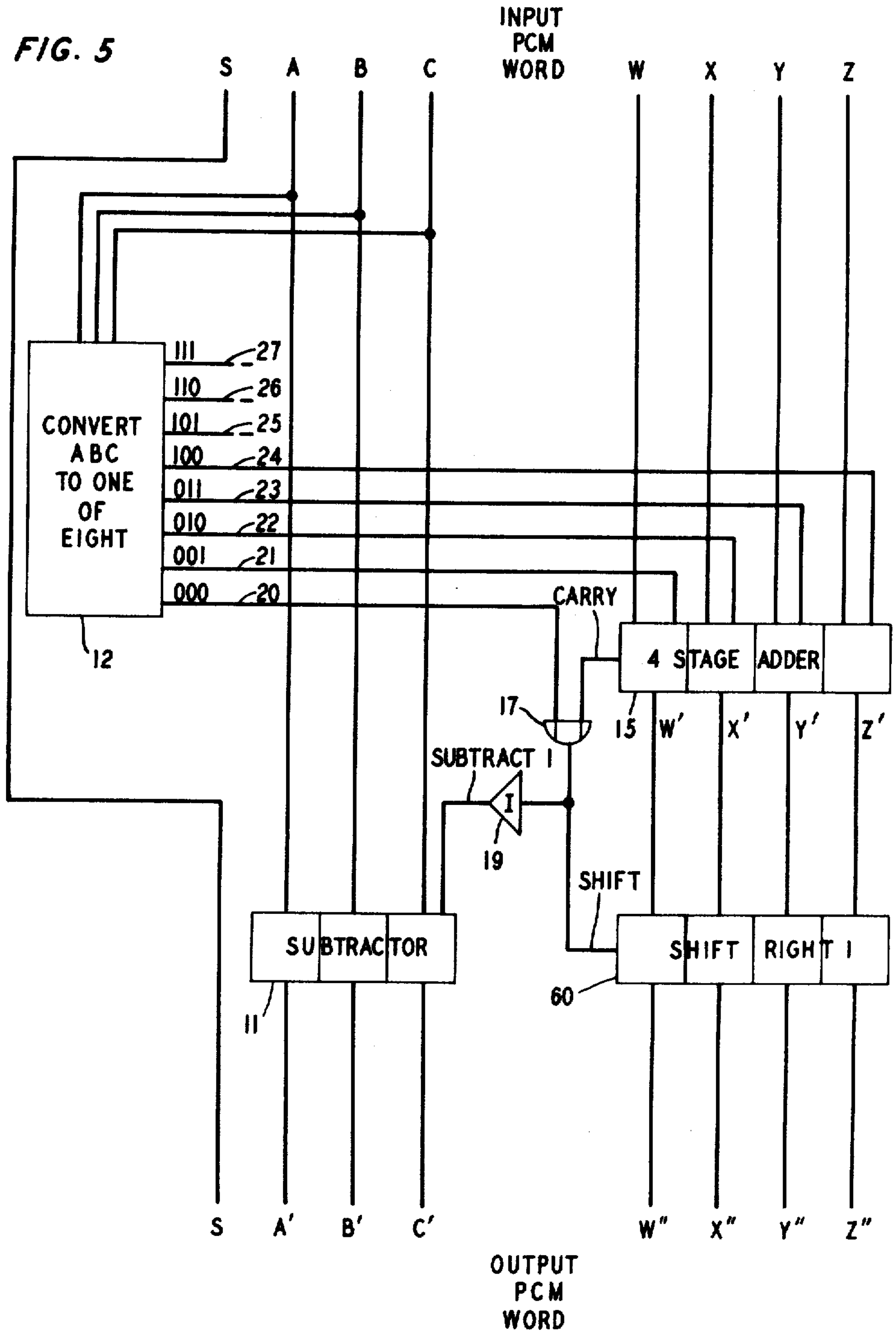
FIG. 5 is an embodiment of the invention suitable for use with the eight-bit mu law code.

A preferred embodiment which performs the above-described algorithm for the eight-bit code is shown in FIG. 5. The bits S ABC WXYZ of the input PCM word are applied to the leads so designated in the Figure. Sign bit S is propagated to the output without alteration, since the attenuation process does not alter the sign of the sampled signal.

Segment code ABC is applied on leads A, B, and C to the subtraction circuit 11 and to decoding circuit 12. Circuit 12 converts the binary value of ABC into a logical one signal level on one of the eight output lines 20–27. For this eight-bit embodiment, only leads 20–24 are utilized. Leads 25–27 may alternatively be absent and the circuitry which produces outputs on leads 25–27 may be eliminated if desired. Thusly, decoding circuit 12 may be alternatively designated a one-out-of-five decoder, where it is understood that the five combinations of interest are five of the possible eight combinations of the three bits ABC.

The subtraction circuit 11 operates to decrement the value of ABC, the minuend, by one when a one, the subtrahend, is present on the lead entering subtractor 11 from inverter 19. When there is no signal on the lead coming from inverter 19, no subtraction is performed by subtractor 11 and the quantity ABC passes unaltered through subtractor 11 to the leads A', B', and C'. Subtractor 11 thus may or may not decrement the segment code depending on the value of the output from OR gate 17.

Position code WXYZ, the addend, is applied on leads W, X, Y, and Z to the four stages of adder 15. Leads 21–24, outputs from decoder circuit 12, the augend, are likewise applied to the stages of adder 15. In operation, a value of ABC = 100 will cause a one to appear on lead 24, thereby incrementing the value of the position code WXYZ in adder 15 by one. Similarly, a segment code of 011 causes an output on lead 23 to increment the position code by two. Segment codes 010 and 001 follow analogously incrementing the position code by four and eight, respectively. The position code WXYZ passes unaltered through adder 15 onto leads W', X', Y', and Z' if the segment code is not in the range 001 - 100.

From the above discussion with reference to FIG. 4, it will be understood that a carry will propagate from the high order stage of adder 15 if, and only if, the PCM code word was in category II of chords 2–5. The occurrence of such a carry calls for the right shifting of the position code. Likewise, the occurrence of the segment code ABC = 000 calls for a right shift of the position code. In order to implement this feature, the carry signal in the output on lead 20 from decoder 12 is logically combined in OR gate 17 to produce a shift signal which is applied to shifting circuit 60. Circuit 60 performs a right shift of one binary position on the signals appearing at leads W', X', Y', and Z' supplying the shifted quantities to leads W'', X'', Y'', and Z'' under control of the shift signal from OR gate 17. In the absence of a shift signal, circuit 60 allows the input to pass through unaltered to the output leads. The absence of a shift signal also is inverted by inverter 19 to produce a subtract one signal operating on subtractor 11.

Though the circuit of FIG. 5 was primarily designed to work with an eight-bit code, this circuit will also be effective for any mu law code of less than eight bits. For example, the seven-bit code S ABC WXY can be attenuated with the circuit of FIG. 5 in one of two ways: For a seven-bit code, lead Z may be forced to a logical zero and the seven bits of the input code applied to the remaining leads. In this situation, the signal on lead Z can never cause a carry to propagate from the high order bit position of adder 15. Therefore, the occurrence of segment code ABC = 100 will never effectuate a right shift and the output PCM code word will be then correctly attenuated. Alternatively, leads 24, Z', and Z'' may simply be disconnected.

FIG. 5 may be extended up to 11 bits by appending additional stages to adder 15 with connections to decoder 12 through leads 25, 26, and 27 and by appending extra stages to the right shift circuit 60. Thus, in general, the circuit of FIG. 5 serves as an illustration of a preferred embodiment for attenuating a PCM code of five to 11 bits.

Figure 6:
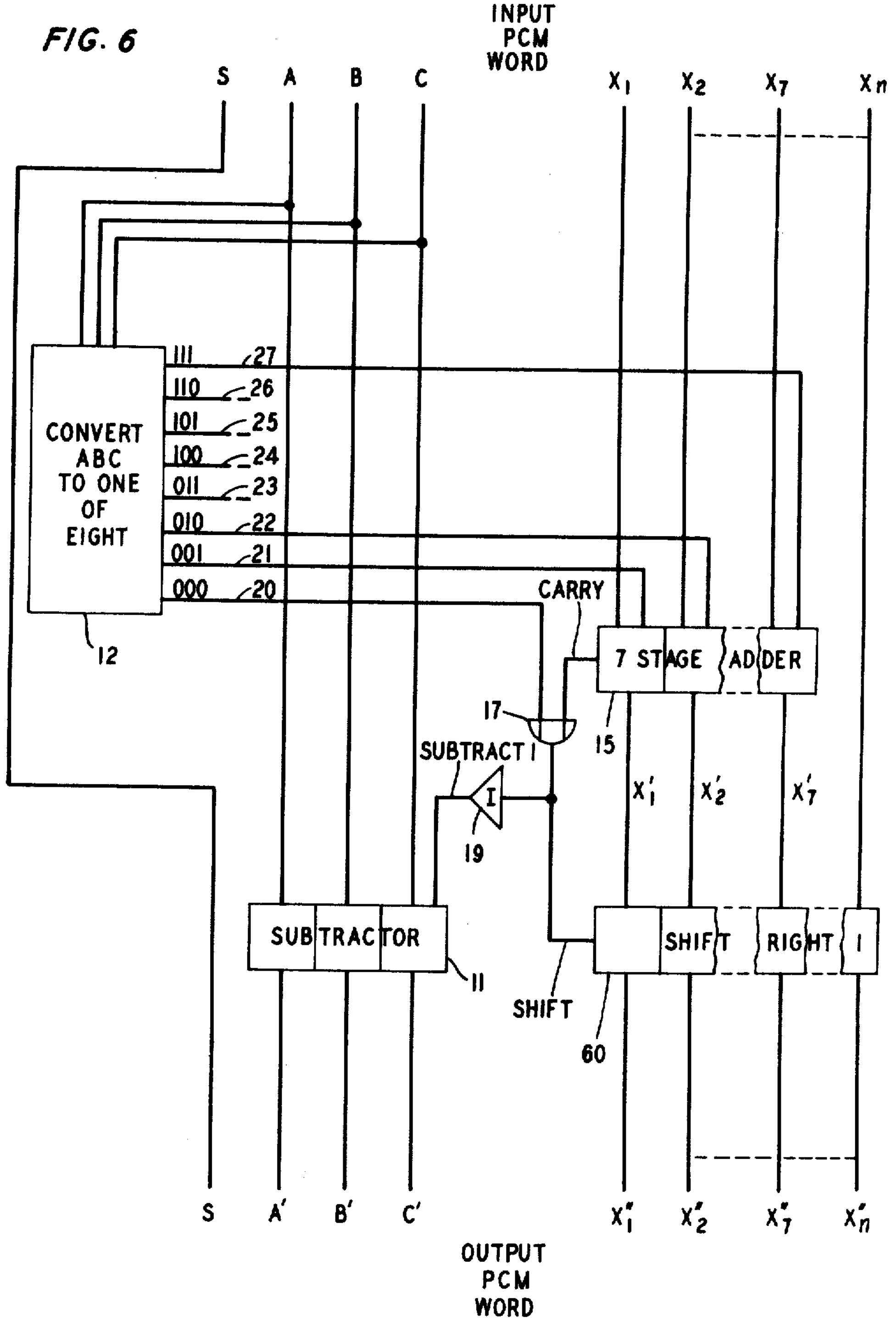
FIG. 6 is a generalization of the embodiment of FIG. 5 for use with an n-bit mu law code where $n > 5$.

FIG. 6 shows how the preferred embodiment of FIG. 5 may be extended to accommodate codes greater than 11 bits in length. FIG. 6 is FIG. 5 extended as above-described to eleven bits, plus additional bits. The 11-bit version is represented by that portion of the circuit extending out to bit $X_7$ thus utilizing a seven-stage adder and accommodating all eight leads emerging from decoder 12. Additional bits represented by the lead $X_n$ are conducted directly to the shift right one circuit 60 without passing through an adder stage. Otherwise, the actions of FIG. 6 are identical to those of FIG. 5.

It should be made clear that the preferred embodiment shown in FIG. 5 is only one of many possible embodiments which become obvious from the teachings of this invention. In order to illustrate this fact, a second embodiment will be described below.

It is seen that the embodiments of FIGS. 5 and 6 implement the rule of selective decrementation of the segment code by direct means. The same process may be implemented indirectly by uniformly decrementing the segment code regardless of its value and then selectively incrementing the segment code in order to restore it to its original value when subsequently it is found to be necessary.

These considerations lead to the following alternative procedure for converting an input PCM code word into its attenuated counterpart: (1) subtract one from the segment code ABC to form the decremented code A'B'C', where subtraction from ABC = 000 is defined to yield A'B'c' = 111; (2) add a one to the binary number A'B'C'WXYZ at a bit position selected as shown in FIG. 4—that is, for chord 2 position W, chord 3, position X, chord 4, position Y, and chord 5, position Z; for chords 6–8, do not add a one; for chord 1, add to bit position C' in order to restore the value of A'B'C' to 000; (3) if bit position C' has been changed by step 2—that is, if a carry bit has propagated into the C' position due to the addition to a lower order bit, or if one was added directly to the C' bit position—shift the position code right one place.

Figure 7:
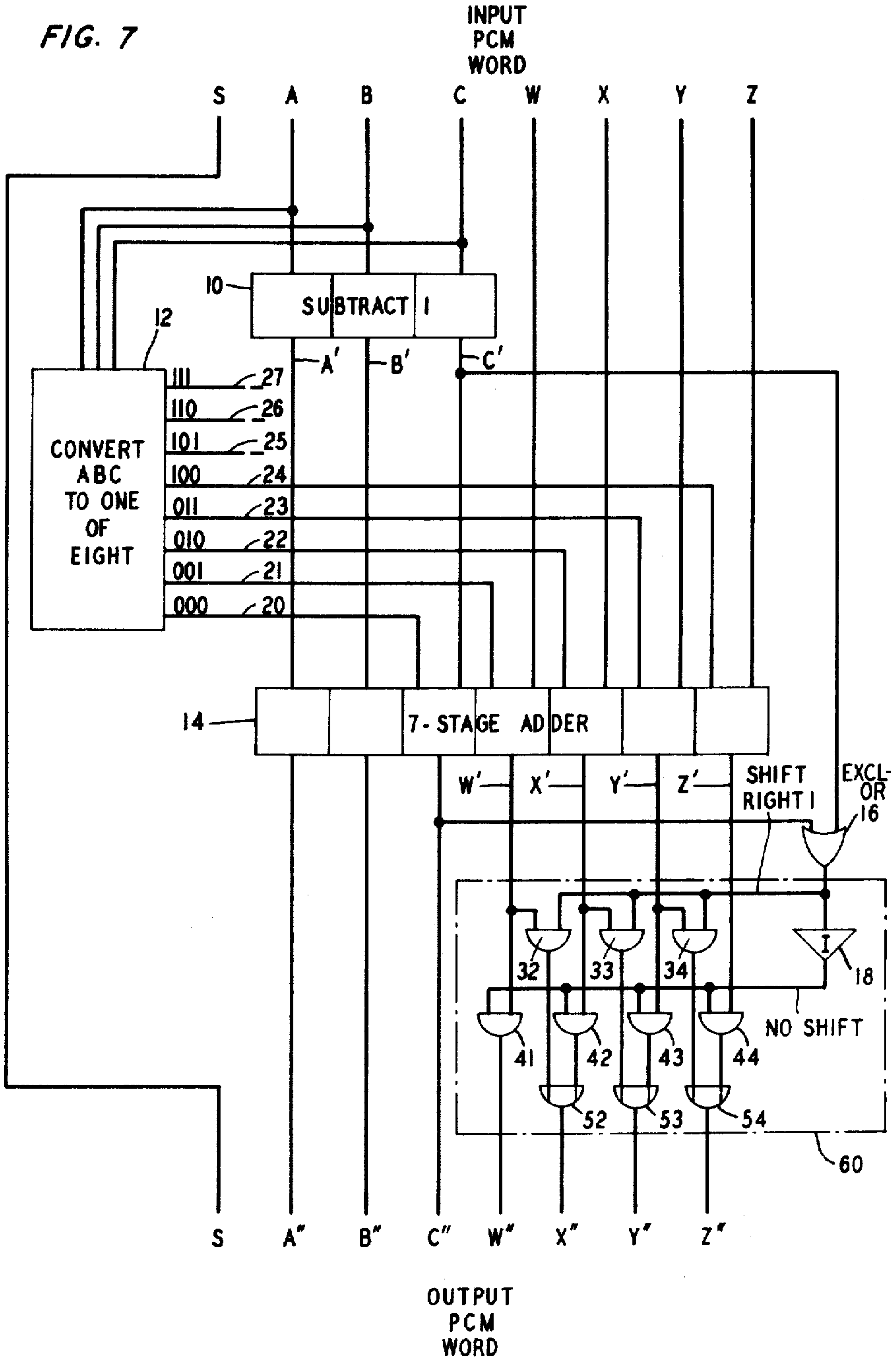
FIG. 7 is a second eight-bit embodiment of the instant invention.

An alternative embodiment which performs the above-described algorithm for the eight-bit mu law code is shown in FIG. 7. The operation of the circuit in FIG. 7 is similar to that of FIG. 5 and therefore description will be confined to the principal points of difference. Segment code ABC is applied on leads A, B, and C to subtraction circuit 10 and to decoding circuit 12. Subtraction circuit 10 uniformly decrements segment code ABC by one producing the decremented output on leads A', B', and C'. The operation of circuit 12 is as hereinabove described. The decremented segment code is applied to the high order three stages of a seven-stage adder 14. The bits of the position code are applied to the low order four stages of the adder. It will be recalled from the operation of the circuit in FIG. 5 that a carry due to incrementation of the position code causes a segment code not to be decremented. For the embodiment of FIG. 7, a carry caused by addition performed on the position code propagates into the third-most significant stage and therefore restores the decremented segment code to its original value. Alternatively, a value of ABC = 000 will cause a one to appear on lead 20 and likewise cause the decremented segment code to be restored to its original value.

The occurrence of such a restoration is detected by comparing the least significant bit of the decremented segment code C′ to the output of the third-most significant stage of adder 14, C″. This function is performed by exclusive OR gate 16. An output from gate 16 indicates that a right shift of one is necessary for the position code. The output of gate 16 is applied to the right shift one circuitry 60, the details of which have been shown in FIG. 7. The outputs of the adder 14 appear on leads A″, B″, and C″ and on leads W′, X′, Y′, and Z′. An output from gate 16 will enable AND gates 32–34. Simultaneously, the output from gate 16 inverted by inverter 18 will inhibit gates 41–44. As a result, the signal on lead W′ will be conducted through gate 32 and then through OR gate 52 to lead X″, thereby shifting the signal on lead W′ right one position. Similarly, X′ will be gated through gates 33 and 53 to appear at Y″, and Y′ will be conducted through gates 34 and 54 to lead Z″. The inhibiting effect of gate 18 will prevent any signal from passing through gate 41, and lead W″ will remain at the zero logical level. Thus in overall effect, a difference in C′ and C″, will cause W′X′Y′Z′ to be shifted right one place, producing the quantity OW′X′Y′Φ

In the event the C′ and C″ are not different, the output of gate 16 will be a zero, thereby inhibiting gates 32–34. Inverter 18 will produce a one output enabling gates 41–44. This will gate signals on W′X′Y′Z′ directly onto leads W″, X″, Y″, and Z″ without shifting. W′ is gated through enabled gate 41, X′ through gates 42 and 52, and so forth for Y′ and Z′.

The circuit of FIG. 7 will work for mu law codes of five to 11 bits by applying techniques as described above for FIG. 5.

Figure 8:
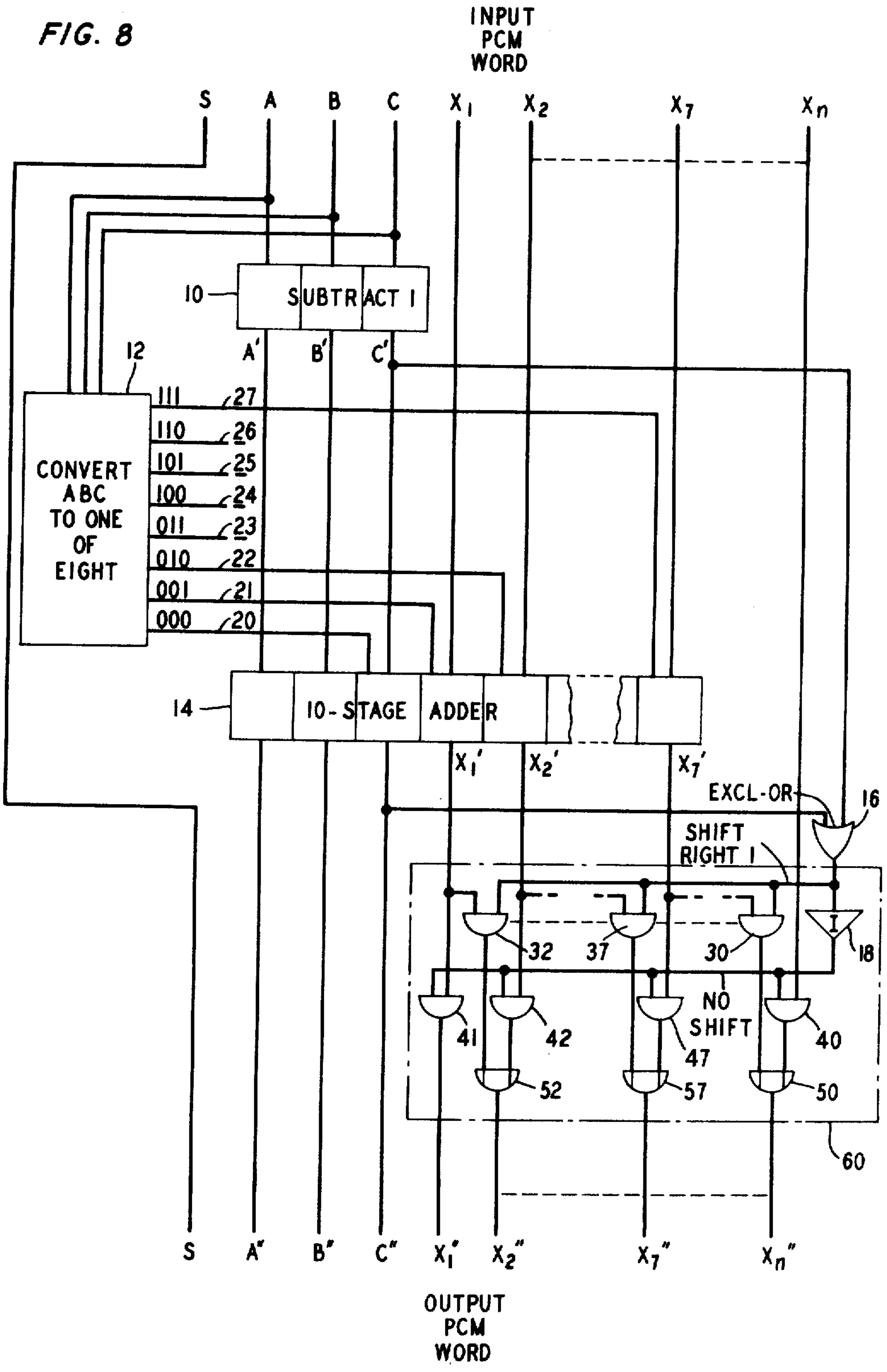
FIG. 8 is a generalization of the embodiment of FIG. 7.

FIG. 8 shows FIG. 7 extended for codes of length greater than eleven. Gates 37, 47, and 57 form the shifting stage for bits appearing on lead $X_7$ while gates 30, 40, and 50 provide the shifting stage for the signal appearing on lead $X_n$. The remainder of FIG. 8 operates in a manner identical to that described in FIG. 7 and analogous to the operation of FIG. 6.

Many modes of construction of the circuits shown in FIGS. 5–8 are possible to one with ordinary skill in the art. They may be modified in detail or altogether different circuits may be used to implement the methods taught herein without departing from the scope of the invention. For example, decoder 12 may be a diode matrix decoder; alternatively, the decoder could be made up of AND gates with direct inputs for the leads to have a one signal and with inhibiting inputs for leads to have a zero signal. The output of the AND gates then become leads 20–27, respectively.

The adders and subtractors shown in the figures may be implemented by utilizing half adders and subtractors for the stages which have only one input lead and a carry or borrow from the previous stage. Full adders (subtractors) must, of course, be used for adder (subtractor) stages which have two input leads plus a carry (borrow). Further details of circuit construction may be found in Chapter 9 of *Pulse, Digital, and Switching Waveforms* by Millman and Taub, McGraw-Hill, 1965, a standard text on the subject. Details will be found there of the construction of AND gates, OR gates, exclusive OR circuitry, adders, subtractors, half-adders, half-subtractors, AND gates with inhibit inputs, and diode matrix decoders. No attempt has been made herein to enumerate all the possible methods of implementation.

To those skilled in the art of logic circuit design, it is evident that the embodiments of FIGS. 5–8 are combinational in nature. This means that the resultant attenuated code depends only on the input code and appears virtually immediately following the application of the unattenuated code at the input. The only delay in achieving the proper output from any circuit element—adder, decoder, etc.—is just the inherent delays of the internal gates themselves, plus the time necessary for the effect of a carry or borrow to propagate through subsequent adder or subtractor stages. Purely combinational circuits contain no memory elements and therefore need no initialization.

Alternative embodiments are apparent once the principles of this invention are understood—for example, counters or registers may be employed instead of adders and subtractors. Shift registers may be used either for the final shifting of the position code, or for aligning a one bit for addition into a chosen bit position of the position code. It will be recognized that these methods utilize techniques of sequential circuitry—that is, memory elements are employed. In most cases, initialization will be necessary and implementation may be most easily carried out synchronously under the control of a clock pulse signal for timing.

Still another method of implementation is the use of a digital computer which operates on the bits of an incoming PCM code word and manipulates then through a stored program utilizing the techniques described herein to generate the attenuated code.

All of these methods are within the contemplation of the present invention; and still other methods may be advantageously employed without departing from the scope of the invention.

What is claimed is:

1. Attenuation apparatus for use with a digital code word comprising a segment code and a position code including:
   - means for decoding the segment code,
   - means responsive to said decoding means for selectively adding a one to a selected bit position of the position code thereby producing a position code sum, wherein said adding means includes carry propagation means,
   - means responsive to said adding means for selectively decrementing the segment code, and
   - means responsive to said adding means for selectively shifting said position code sum.

2. Apparatus as in claim 1 wherein said means for selectively decrementing the segment code further comprises:
   - means for decrementing the segment code by one, and
   - means responsive to said adding means and said decoding means for selectively incrementing the decremented segment code.

3. A digital attenuator for producing 6 decibels of attenuation of a pulse code modulation signal encoded according to the eight-bit mu = 255 law wherein the segment code is designated by the bits ABC and the position code is designated by the bits WXYZ comprising:

a decoder which operates on bits ABC to produce an output on one of five output leads according to the values of ABC ranging from 000 to 100, a subtract-one circuit which operates on ABC to produce the decremented value A'B'C', a seven-stage binary adder to which is applied an addend A'B'C'WXYZ and an augend comprising the five output leads from the decoder applied to the low-order stages of the adder to produce the sum A''B''C'W'X'Y'Z', means for detecting a difference in the low order bit of the decremented segment code code C' and the output of the third-most significant stage of the adder C'', and a shift-one circuit which operates on the low order four bits W'X'Y'Z' of the sum in response to said detecting means.

4. A digital attenuator for producing 6 decibel attenuation of a pulse code modulation signal encoded according to the eight-bit mu = 255 law wherein the segment code is designated by the bits ABC and the position code is designated by the bits WXYZ comprising:

a decoder which operates on ABC to produce an output on one of five output leads according to the values of ABC ranging from 000–100, a four-stage binary adder to which is applied an addend WXYZ and an augend comprising the four output leads from the decoder which produces an output according to the values ABC ranging from 001–100 which adder produces sum bits W'X'Y' Z' and a carry signal indicating overflow from the high order W' position, means for producing a control signal in response to either the carry signal or the output from said decoder indicating a value of ABC = 000, a shift-one circuit which operates on the sum bits $W'X'Y'\Phi^{Z'}$ in response to the control signal, and a subtractor which operates on ABC to decrement its value by one in response to the inverse of the control signal.

5. The machine method of attenuating a digital pulse code modulated signal including electrical signals representing segment and position codes which comprises the steps of:

selectively incrementing by machine electrical signals representing the position code by an amount dependent upon the value of the segment code, thereby producing electrical signals representing a position code sum, selectively shifting by machine electrical signals representing the position code sum dependent upon the value of the segment code and upon the occurrence of an electrical signal representing overflow of the position code sum, and selectively decrementing by machine electrical signals representing the segment code in the event the step of shifting is not performed.

6. The machine method as in claim 5 wherein the step of selectively decrementing by machine electrical signals representing the segment code further comprises the steps of:

uniformly decrementing by machine electrical signals representing the segment code, and selectively restoring by machine electrical signals representing the segment code.

7. The machine attenuation method for a pulse code modulation signal for use with electrical signals representing segment and position digital codes comprising the steps of:

decoding by machine electrical signals representing the segment code thereby determining the segment identity;

adding by machine to the electrical signals representing the position code electrical signals representing an amount chosen in response to the segment identity thereby producing electrical signals representing a position code sum and selectively producing an electrical signal representing overflow of the position code sum;

subtracting by machine one from the electrical signals representing the segment code in response to the segment identity and the absence of the electrical signal representing overflow from said adding step; and shifting by machine electrical signals representing the position code sum in response to the segment identity and the electrical signal representing overflow from said adding step.

8. The machine attenuation method performed on a nonlinearly encoded pulse code modulation signal including electrical signals representing position and segment codes comprising the steps of:

decoding by machine electrical signals representing the segment code thereby determining the identity of the segment;

selectively adding by machine an electrical signal representing a one to a selected bit position of the electrical signal representing the position code dependent on the segment identity and allowing carries to propagate, thereby producing electrical signals representing a position code sum;

detecting by machine any electrical signal which represents a carry which propagates from the most significant bit position of the electrical signal which represents the position code;

producing by machine an electrical shift signal in response to the carry detection and dependent on the segment identity;

shifting by machine electrical signals representing the position code in response to the shift signal; and decrementing by machine electrical signals representing the segment code in response to the inverse of the shift signal.

9. The machine attenuation method performed on a nonlinearly encoded pulse code modulation signal including electrical signals representing position and segment codes comprising the steps of:

decoding by machine electrical signals representing the segment code, thereby determining the identity of the segment;

decrementing by machine electrical signals representing the segment code by one;

selectively adding by machine an electrical signal representing a one to a selected bit position of the electrical signal representing the position code and the electrical signal representing the decremented segment code dependent on the identity of the segment and allowing carries to propagate from the most significant bit position of the electrical signal representing the position code to the least significant bit position of the electrical signal representing the segment code, thereby producing electrical signals representing a position code sum;

detecting by machine an electrical signal representing any change which occurs in the least significant bit position of the electrical signals representing the segment code as a result of the above recited steps;

producing by machine an electrical shift signal in response to any said change; and shifting by machine electrical signals representing the position code sum in response to the shift signal.

10. Apparatus for uniformly reducing the amplitude of a nonlinearly encoded analog signal, said signal being represented by a segment code and a position code, which comprises:

a decoder which operates on the segment code to produce an output on a selected one of a multiplicity of leads dependent on the identity of the segment, an adder, having provisions for carry propagation, which combines the position code and the output appearing on the leads from the decoding circuit, a control circuit responsive to the adder which selectively produces a shift control signal, a shift-one circuit which selectively operates on the output of the adder in response to the shift control signals, and a subtractor for selectively decrementing the segment code by one in response to the shift control signal.

11. Apparatus for uniformly reducing the amplitude of a nonlinearly encoded analog signal, said signal being represented by a segment code and a position code, which comprises:

a decoder which operates on the segment code to produce an output on a selected one of a multiplicity of leads dependent on the identity of the segment, an adder, having provisions for carry propagation, which combines the position code and the output appearing on the leads from the decoding circuit, a control circuit responsive to the adder which selectively produces a shift control signal, a shift-one circuit which selectively operates on the output of the adder in response to the shift control signals, and a subtractor which uniformly decrements the segment code by one, wherein said adder includes means for selectively incrementing the decremented segment code in response to said decoder.

* * * * *